United States Patent [19]

Harding

[11] Patent Number: 4,831,671
[45] Date of Patent: May 23, 1989

[54] PORTABLE TOILET CABANA

[75] Inventor: George W. Harding, Clearwater, Fla.

[73] Assignee: Poly-John Enterprises Corp., Whiting, Ind.

[21] Appl. No.: 85,188

[22] Filed: Aug. 14, 1987

[51] Int. Cl.[4] ............................................. A47K 11/02
[52] U.S. Cl. .......................................... 4/460; 52/282
[58] Field of Search ................... 4/460, 462, 463, 449, 4/614, 459, 476, 477; 52/79.5, 79.1, 578, 581, 281, 282, 285, 284, 79.4, 236.1, 192, 194; D25/32, 157; 98/115.3

[56] References Cited

U.S. PATENT DOCUMENTS

| 704,987 | 7/1902 | Tufts | 52/236.1 |
|---|---|---|---|
| 3,302,547 | 2/1967 | Wasserman | 52/236.1 |
| 4,577,351 | 3/1986 | Harding | 4/460 |

FOREIGN PATENT DOCUMENTS 2843301 4/1980 Fed. Rep. of Germany ..... 52/236.1

Primary Examiner—Henry J. Recla
Attorney, Agent, or Firm—Harness, Dickey and Pierce

[57] ABSTRACT

A portable toilet cabana is formed of four, wide, relatively resilient sheet plastic walls whose adjacent vertical edges are connected together by narrow sheet plastic panels that are roughly a quarter of the width of the walls to form an octagon-like enclosure with alternating wide and narrow sides. The widths of the walls are close to the maximum width limit at which the walls tend to buckle, so that the panels enlarge the enclosure. The adjacent edges of the walls and panels are bent into flanges that are interconnected. A vertically-extending channel is bent along the middle portion of each panel, and a vertically outwardly-extending channel is bent close to each of the edges of the walls, so that the channels and connected flanges form reinforcement columns for the cabana.

11 Claims, 1 Drawing Sheet

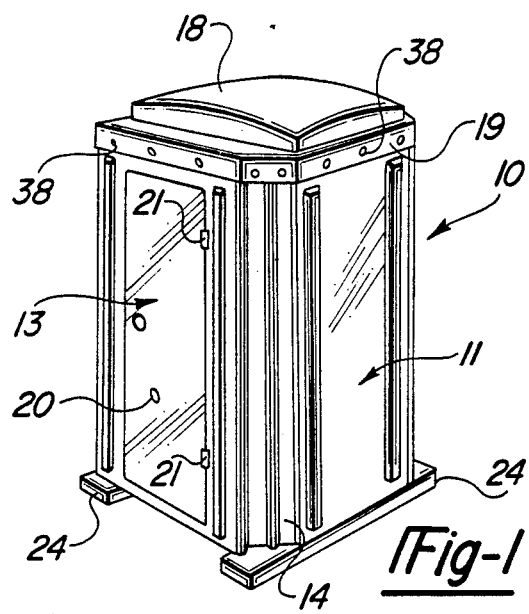
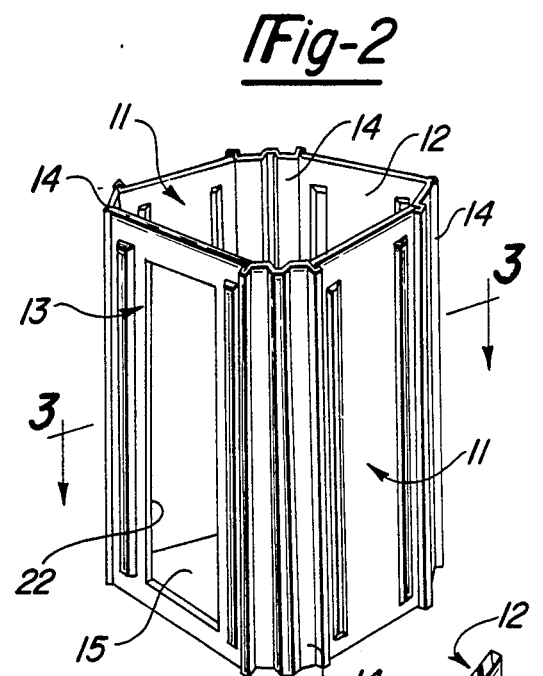
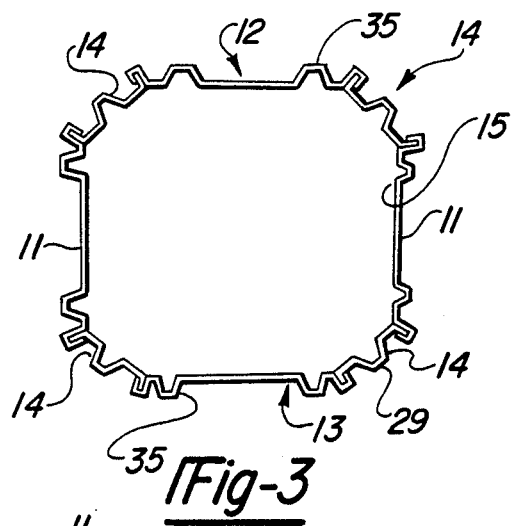
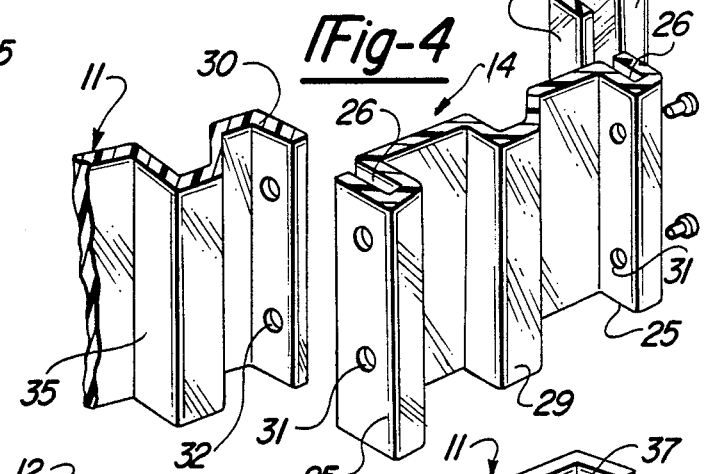
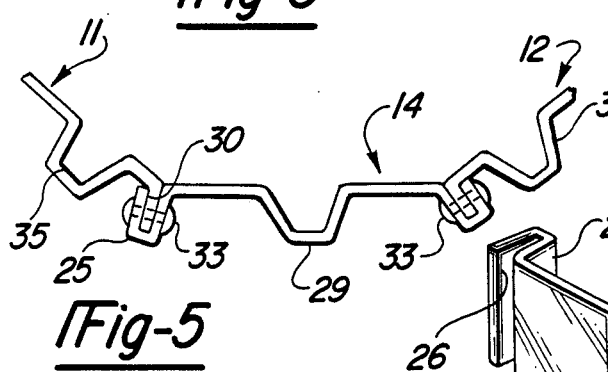
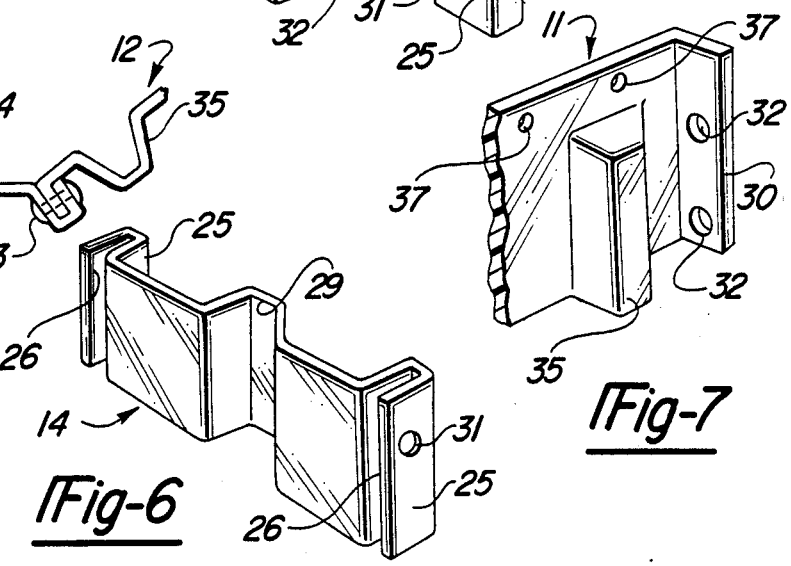

PORTABLE TOILET CABANA

BACKGROUND OF INVENTION

This invention relates to a cabana construction formed of thin sheets of plastic material used for portable toilets or other small, portable building structures. An example of such a cabana is disclosed in U.S. Pat. No. 4,577,351, issued Mar. 25, 1986 to George W. Harding for a Portable Toilet Cabana.

Portable toilet cabanas, as for example, the type disclosed in the above-mentioned patent, may be formed of four walls made of thin, sheet plastic material, whose side edges are connected together to form a generally square enclosure. An opening formed in one of the walls provides a doorway within which a suitable door may be hingedly mounted.

The walls may be manufactured by vacuum-forming relatively large, thin sheets of a suitable plastic material, such as a polyethylene-type plastic. The walls are generally flat, but may include indentations or other impressed or embossed design and structural formations. Thus, each of the walls, excluding the wall with the door, is a substantially monolithic sheet of plastic whose height defines the height of the cabana enclosure and whose width defines the width dimension of the cabana enclosure.

There is a practical limitation on the size of the wall-forming sheets of plastic, depending upon the thickness of the sheet, because the plastic is relatively resilient and tends to buckle or flex excessively when its size is excessive. The height of a cabana used for toilet purposes is within the range of a person standing upright, but the width or depth of a cabana can be varied up to the point where the width of the wall-forming sheets exceeds the limit where the sheet tends to buckle or bend. While the limit may be increased by increasing the wall thickness of the sheet, since plastic is relatively expensive in the quantity needed for a cabana, it is desirable to keep the sheets at the minimal thickness dimension which is practical for this type of cabana construction, while obtaining a maximum depth and width cabana with a given sheet of a given plastic material.

In some types of cabana constructions, as for example, a cabana large enough for wheelchair-bound users, or which otherwise requires a large size enclosure, it is desirable to exceed the wall width limits that are attainable, at a reasonable cost, with four sheet plastic walls. Thus, this invention is concerned with increasing the enclosure size of a cabana, without increasing the wall widths, by means of connecting the wall edges together with narrow, substantially flat or somewhat curved panels so as to generate a larger, irregular octagon-like shaped enclosure. The enclosure shape has alternating wide and narrow sides which, are rigidified by integral column-like support elements. This permits an increase in the enclosure width and depth dimensions without requiring excessive plastic and without exceeding the practical width limits of the walls.

SUMMARY OF THE INVENTION

The invention contemplates forming a portable cabana in an irregular octagon-like cross-sectional shape made of alternating long and short sides. These sides are provided by thin plastic sheets that are formed into alternating wide walls and interconnecting narrow panels. The adjacent edges of the panels and sheets are bent into flanges which interlock and form multi-ply, column-like strips that extend the height of the cabana. In addition, the middle portions of the panels are bent into vertical channels, and the walls are similarly bent into vertically extending channels adjacent their edges to provide reinforcing columns, as well as protective bumpers.

An object of this invention is to provide a rigidified, larger than expected cabana enclosure utilizing a given thickness and type of plastic sheet material out of which the cabana walls are formed. That is, the depth and width dimensions of the cabana are increased, beyond the expected capacity of the walls to remain rigid, by interconnecting the wide walls with narrower corner panels and utilizing the connections for rigidifying the enclosure. These connections are formed of bent flanges which provide multi-ply columns for rigidifying the cabana. Such columns, together with vertically extending bent channels formed in the walls and panels, sufficiently reinforce the cabana to eliminate the need for additional reinforcing frames.

A further object of this invention is to enable the construction of a cabana whose dimensions exceed the normal rigidity limits of the sheet plastic walls, without the need to increase the thickness or plastic content of the walls.

Still a further object is to provide a relatively large cabana construction that is economical because it enables the use of relatively thin plastic sheets which, ordinarily, would not be adequately rigid.

These and other objects and advantages of this invention will become apparent upon reading the following description, of which the attached drawings form a part.

DESCRIPTION OF DRAWINGS

FIG. 1 is a perspective view of the assembled cabana.

FIG. 2 is a perspective view, to a slightly enlarged scale, of the cabana enclosure formed of the walls and connecting panels.

FIG. 3 is an enlarged cross-sectional view taken in the direction of arrows 3—3 of FIG. 2.

FIG. 4 is an enlarged, fragmentary, perspective view of a panel and two adjacent wall portions in position for assembly.

FIG. 5 is a top, plan view of a fragment of the enclosure, shown to an enlarged scale, illustrating the connections between a panel and its adjacent wall portions.

FIG. 6 is an enlarged, perspective, fragmentary view of a panel as it appears from inside the cabana enclosure.

FIG. 7 is a fragmentary, perspective view of an upper corner of wall.

DETAILED DESCRIPTION

Referring to the drawings, the cabana 10 is constructed of a pair of opposing side walls 11, a rear wall 12 and a front wall 13. The walls are connected together, at their vertical edges, by connector or corner panels 14.

The walls and panels are made of thin, stiff, but relatively resilient sheet plastic material, such as polyethylene-type plastic sheets of roughly 0.125 inches in thickness. The thickness of the sheets and the plastic material out of which they are constructed may vary depending upon the availability and suitability of particular plastics and the strength requirements for a particular construction. By way of example as to sizes, a typical wall may be about 41 inches wide and about 76¾ inches high, and a typical panel may be about one foot wide and of the same height. The sizes of the panels and walls will be varied according to the requirements.

The cabana includes a floor 15 which is made of a rigid sheet of plastic material and is fastened in place in some suitable manner, within the enclosure formed by the walls and the connected panels. The manner in which the floor is connected in place is not illustrated, as it is not material to the invention herein.

The enclosure is covered with a roof or cover 18 made of a plastic sheet. The roof or cover is sized and shaped to fit over the irregular octagonal shape of the enclosure. It is preferred with a downwardly-depending, integral flange 19 which encircles the upper edges of the walls and panels and is secured to them.

A door 20 (see FIG. 1) is secured by hinges 21 in a door opening 22 (see FIG. 2) for access to the interior of the cabana.

For ease in moving and positioning the cabana, it is preferably provided with a lower structure which includes skids 24 that may be attached to the floor 15, either directly or through a suitable pallet upon which the floor is positioned (not shown).

As shown in FIGS. 4-6, the connector or corner panels 14 have their vertical side edges bent to form side edge connector flanges 25. The edge material, at each side edge of the respective panels, is bent outwardly and then double-bent backwardly to provide a channel 26 (see FIG. 4) which opens inwardly of the enclosure. The central portion of the panel is also bent into a channel 29 which extends vertically for the height of the panel.

The opposite vertical side edges of the walls 11, 12 and 13 are bent outwardly to form wall edge connector flanges or tongues 30. These flanges are inserted into the double-bent channels 26 of the panels for interlocking the vertical edges of the walls with the adjacent panel vertical edges. In order to lock the flanges together, aligned holes 31 are formed in the panel flanges 25 and corresponding holes 32 are formed in the wall flange to receive rivets 33 or other suitable mechanical fasteners. Thus, the wall edge flanges and the double-bent channel-forming panel edge flanges together provide a three-ply, rigid, vertical, column-like rigidifying strip at the opposite edges of the panels.

The walls are provided with batten strips formed of integrally bent channels 35 at locations close to the vertical edges of the wall. These channels 35 preferably extend for most of the height of the walls, but terminate short of the upper edges and lower edges of the walls. (see FIG. 7). However, they may be made to extend the full height, depending upon the strength requirements of the cabana construction. Holes 37 may be formed along the upper edges of the walls (see FIG. 7) and panels to receive screws or rivets 38 for fastening the roof flange 19 to the walls and panels. Suitable blocks or spacers may be used where the upper edge of the wall is spaced inwardly from the roof flange.

The channels 35, in addition to rigidifying the cabana, also act as resilient bumpers at the corners. These bumpers resiliently absorb shocks and impacts which occur in moving and lifting the cabanas. Since sheets formed of different plastic materials have a maximum size at which they will begin to buckle or flex unduly, it is necessary to limit the width of the walls to below the size where the wall will become too flexible or lack sufficient stiffness for the purpose. The heights of the walls are generally fixed by the necessity of forming the cabana tall enough to enable a person to stand within it. The thickness of the sheet material used can be increased to thereby permit using larger wall panels. However, in order to conserve the expense of the amount of plastic used, it is desirable to limit the thickness of the sheets and, consequently, the widths of the walls to the point where the walls maintain their rigidity in use. Thus, the utilization of the relatively wide corner-forming panels, which are considerably narrower than the walls, but are still relatively wide, increases the depth and width of the cabana enclosure a considerable amount. Thus, for a given thickness of plastic sheet material, which provides a limit on the width of the wall, the enclosure size may be increased through the use of the panels. Conversely, the panels permit the use of thinner plastic material for a given size enclosure, without sacrificing rigidity.

Significantly, the overall rigidity of the building-like cabana is enhanced by the vertical columns provided by the integrally bent channels and the multi-thickness strip formed by the interengaged edge flanges.

This invention may be further developed within the scope of the following claims. Accordingly, it is desired that the foregoing description be read as illustrative of an operative embodiment.

Having fully described in operative embodiment, I now claim:

1. A portable toilet-type cabana comprising:

four vertically arranged, generally flat, wide walls arranged at right angles to each other and made of relatively resilient, thin plstic sheet material, with each of the vertical side edges of the walls being bent into an integral, narrow edge flange extending outwardly of the plane of the respective wall, and the adjacent side edges of the wall being spaced apart;

a generally flat, narrow corner panel formed of thin plastic sheet material and being of about the same height as the walls, extending between each pair of adjacent spaced apart wall side edges at an obtuse angle relative to their respective walls for interconnecting the adjacent wall side edges for forming an octagon-like enclosure with alternating wide and narrow sides, the width of the corner panels being roughly in the range of about a quarter of the width of the walls;

the vertical side edges of the panels being bent into integral, narrow edge flanges extending outwardly of the plane of their respective panels and outwardly of the enclosure, and arranged in contact with an adjacent wall side edge flange;

each of the adjacent panel vertical side edge flanges being double-bent into an integral channel and the each flange of said wide wall forming an integral tongue which is snugly fitted within the respective channel of said panel;

and fastening means securing the interfitted flanges together to provide a three-ply thick column-like strip extending the height of the walls at the opposite sides of the narrow sides defining the octagon-like enclosure for reinforcing and rigidifying the enclosure.

2. A portable cabana as defined in claim 1, including a door opening formed in one of the walls and a door hingedly mounted in said door opening.

3. A portable cabana as defined in claim 1, and at least some of the panels being bent, between their vertical edges, into an integral, vertically extending, substantially uniform width channel which extends outwardly of the panel, relative to the interior of the enclosure, for substantially the full height of its respective panel to form an inwardly-opening, vertical column between the column-like strips formed along the edges of the panel, whereby the channel rigidifies the cabana enclosure and acts like a resilient bumper to protect against impacts against the cabana.

4. A portable cabana as defined in claim 3, and including at least some of the walls having integral, outwardly bent channels that are located close to their vertical edges and which extend vertically for a substantial portion of the height of the walls to provide reinforcing columns and resilient, protective bumpers.

5. A portable cabana as defined in claim 4, and including a cabana roof cover having a peripheral edge formed with a downwardly-extending cover flange shaped to enclose and engage upper edge portions of the sheet material defining the walls and panels, and mechanical fasteners securing the cover flange to said upper edge portions.

6. A portable toilet cabana comprising:

four wide walls whose adjacent edges are interconnected by narrow panels to form an octagon-like enclosure of alternating wide and narrow sides;

the walls and panels being formed of thin, relatively resilient plastic sheet material which is sufficiently rigid to hold its wall and panel shapes, but which tends to buckle upon exceeding predeterminable widths for preselected sheet thicknesses and heights;

the widths of the walls being a small amount less than the predetermined width;

the panels being of substantial width, roughly in the range of about a quarter of the width of the wall, so that the enclosure formed by the four walls is octagonal and enlarged by the panels;

the adjacent pairs of edges of the walls and panels being bent outwardly to form narrow integral edge flanges one of either the wall of the panel edge flanges being double bent into a channel shape;

and the other of said flanges being inserted within the channel shape to form a three-ply thick vertical column;

and mechanical fasteners extending through the plys for tightly connecting the flanges together and rigidifying the column.

7. A portable toilet cabana as defined in claim 6, and including at least some of the panels having an integrally formed vertically extending, substantially uniform width channel extending the height of the panel to form a bent, vertically-directed, open column-like reinforcement located roughly midway between the panel edges.

8. A portable toilet cabana as defined in claim 7, and including at least some of the walls having integral, outwardly bent channels located close to their vertical edges and extending vertically for a substantial portion of the height of the walls for rigidifying the cabana structure and for forming a protective bumper against impacts directed against the cabana.

9. A portable toilet cabana as defined in claim 8, and including a roof cover formed of thin sheet plastic material, having a peripheral edge flange extending downwardly along its edge, with the flange shaped to enclose and to engage upper edge portions of the walls and panels, and including mechanical fasteners securing the cover flange to said upper edge portions.

10. A portable toilet cabana comprising:

four wide walls whose edges are interconnected by narrow panels to form an octagon-like enclosure of alternating wide and narrow sides;

the walls and panels being formed of thin, relatively resililient plastic sheet material having sufficient stiffness to maintain the panel and wall shapes, but which tend to buckle upon exceeding predeterminable widths for preselected sheet thickness and wall heights;

the widths of the walls being a small amount less than that which would exceed said predeterminable widths at which said walls would tend to buckle;

the panels being of substantial width, roughly in the range of about a quarter of the width of the walls so that the enclosure formed by the four walls is octagonal and is enlarged by the interconnecting panels;

the edges of said panels being double bent into outwardly extending channels and the edges of said walls being bent into outwardly extending tongues that are snugly fitted with a respective channel, and which form multi-ply, vertical strips which act as reinforcing column-like formations;

each panel having an integral, bent, vertically-extending channel located between its opposite edges and extending substantially the full height of the panel to form a column-like rigidifying formation;

and integral, bent channels formed in the walls adjacent their vertical edges and extending a substantial portion of the height of the walls for forming rigidifying columns and bumpers for protecting against impacts to the cabana.

11. A cabana as defined in claim 10, and including a door opening formed in one of the walls and a door hingedly covering such opening;

a roof cover formed of thin, sheet plastic material, shaped to cover over the upper edges of the walls and panels;

and with an integral, downwardly-directed peripheral edge flange formed on the cover for encircling and engaging portions of the walls and panels, and mechanical fastening means interconnecting the roof cover flange with the walls and panels.

* * * * *